UNITED STATES PATENT OFFICE.

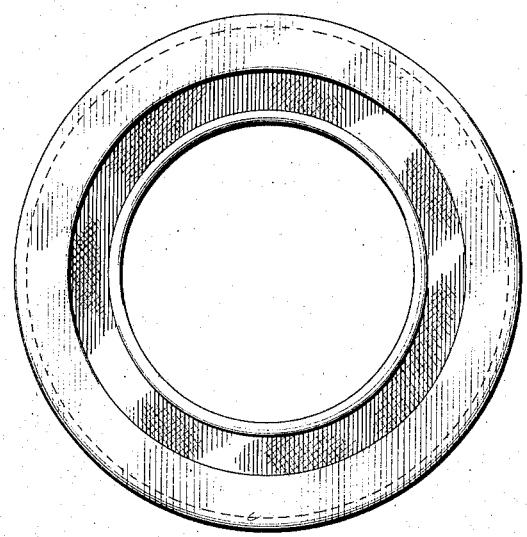
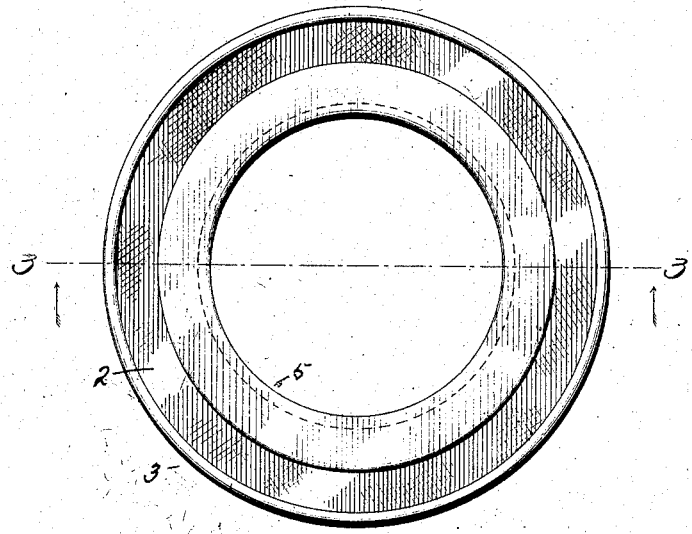

HARRY E. GREY, OF PHILADELPHIA, PENNSYLVANIA, ASSIGNOR OF ONE-HALF TO JOHN F. HOLLAND, OF PHILADELPHIA, PENNSYLVANIA.

GASKET.

No. 864,419.

Specification of Letters Patent.

Patented Aug. 27, 1907.

Application filed April 29, 1907. Serial No. 371,000.

*To all whom it may concern:*

Be it known that I, HARRY E. GREY, a citizen of the United States, and a resident of Philadelphia, State of Pennsylvania, have invented certain new and useful Improvements in Gaskets, of which the following is a full, clear, and complete disclosure.

The object of my invention is to provide a gasket formed of non-metallic and metallic packing materials so combined that the gasket will utilize all of the desirable qualities of each material.

With this object in view, the invention consists in the novel construction hereinafter described and claimed.

In the accompanying drawings, Figure 1 is a plan view of one side of a gasket constructed in accordance with this invention; Fig. 2 a plan view of the other side of the same, and Fig. 3 a sectional view of the same taken on the line 3—3 of Fig. 2.

Referring to the drawings, which show the particular embodiment of my invention which I have selected to illustrate the same, the packing ring or gasket 1, comprising a non-metallic annulus 2, a metallic ring 3 covering substantially the outer half of one side of the non-metallic annulus, and having its outer edge folded over and binding the outer edge of the same, and a metallic ring 5 covering the inner half of the other side of the said annulus, and having its inner edge folded over and binding the inner edge of the annulus, the outer edge 7 of the said inner ring 5 being substantially in alinement with the inner edge 8 of the said outer ring 3.

The two rings 3 and 5 may be formed, without any loss of material from a single ring divided by a single cut extending along the edge 7 to form the inner and outer edges of the two separate rings, and furthermore by this construction the inner edge of the outer ring and the outer edge of the inner ring may pass each other when the gasket is compressed, preventing the binding of the rings one over the other, and the space between the adjacent edges of the metallic rings being small, the gasket thus has a layer of metallic and a layer of non-metallic material throughout substantially its entire width.

The advantages of this construction are that the gasket or ring presents a continuous metallic surface and also a continuous non-metallic surface upon each side; the metallic material binds the non-metallic material at both edges and prevents it from blowing out or from being pressed in; the metallic portions also protect the non-metallic portion from contracting with the steam, gas, or other fluid or liquid surrounding it, and thus protect it from being burned or eaten away; and furthermore the metallic portions protect the non-metallic portion from displacement or damage by vibration or expansion and contraction, due to change in temperature or similar causes.

In constructing this ring, either rubber, asbestos, leather, paper, fibrous material, or almost any compressible material may be used for the non-metallic portion of the ring; and copper, or any other similar material, may be used for the metallic portions.

When the packing ring is to come in contact with acids, suitable acid resisting materials can be used in the construction; and the materials in any case may be selected in accordance with the nature of the work to be performed.

I do not wish to limit myself to any particular metallic or non-metallic substance in this invention, and furthermore, I do not wish to limit myself to the combination of a metallic material with a non-metallic as the invention could be applied to a gasket, comprising a non-metallic body portion and a non-metallic instead of a metallic binder, or both materials might be metallic, one being harder and more tenacious than the other to act as a binder.

I have used the designations metallic and non-metallic simply to indicate a comparatively hard and a comparatively yielding material, and furthermore I do not limit myself to a gasket made in the form of a ring, as this invention could be applied to a gasket made in the form of a strip designed to be laid straight or to be wrapped between surfaces to be packed.

Having thus fully described my invention, what I claim and desire to protect by Letters Patent is:

1. A gasket comprising a yielding body member and a less yielding binder member overlapping the sides of said body member, and presenting continuous surfaces of said body member and of said binder member upon each side of said gasket.

2. A gasket comprising a non-metallic body member and a metallic binder member overlapping the sides of said body member, and presenting continuous metallic and non-metallic surfaces upon each side of said gasket and extending the full length thereof.

3. A gasket comprising a non-metallic body member and a metallic binder member overlapping the sides of said body member, and presenting continuous metallic and non-metallic concentric surfaces on each side of said gasket.

4. A gasket comprising a metallic body member and a non-metallic binder member overlapping the sides of said body member, and presenting continuous metallic and non-metallic surfaces on each side of said gasket, and having a metallic edge.

5. A gasket comprising a non-metallic body member and a metallic binder member overlapping the sides of said body member, and presenting continuous non-metallic surfaces upon each side of said gasket, said gasket having a metallic edge.

6. A gasket comprising a non-metallic body member and independent metallic binder members overlapping the sides of said gasket, and presenting continuous non-metallic surfaces upon each side thereof, and having metallic inner and outer edges.

7. A gasket comprising a non-metallic annular body member, a metallic covering for said body extending upon one side thereof from its inner periphery to a line substantially midway between its inner and outer peripheries, and a separate metallic covering for the opposite side of said body extending from its outer periphery inwardly to a line substantially opposite the outer edge of the inner covering.

8. A gasket comprising a non-metallic ring, a metallic covering for said ring binding the inner edge thereof and extending upon one side to a line about midway between the peripheries of the ring said ring presenting continuous surfaces upon each side of said gasket.

9. A gasket comprising a non-metallic ring, a metallic covering for said ring extending upon one side from the inner edge thereof, and having its inner edge flanged and binding the inner edge of said ring, and a separate metallic ring having its outer edge flanged and binding the outer edge of said non-metallic ring, the said outer ring covering the other side of the said non-metallic ring from its outer periphery to a line opposite the outer periphery of the inner metallic ring.

10. A gasket comprising a non-metallic ring, a metallic ring covering the outer portion of one side of said non-metallic ring, and a separate metallic ring covering the inner portion of the opposite side of said non-metallic ring.

11. A gasket comprising a non-metallic ring, a metallic ring covering the outer portion of one side of said non-metallic ring, and a separate metallic ring covering the inner portion of the opposite side of said non-metallic ring.

12. A gasket comprising a non-metallic ring, a metallic ring binding the outer edge of said gasket, and extending over the outer surface of one side thereof, and a separate metallic ring binding the inner edge of said gasket and extending over the inner portion of the other side thereof.

13. A gasket comprising a body portion, and independent binder portions upon the edges and overlapping the sides thereof.

14. A gasket comprising a yielding body portion, and independent less yielding binders upon the edges and overlapping the sides thereof.

15. A gasket comprising a body portion, and independent binder portions upon the edges and overlapping the sides thereof, the surface of said body portion being exposed upon opposite sides of the said gasket.

16. A gasket comprising a body portion, and independent binders upon the edges and overlapping the sides thereof, the said body portion being exposed upon each side of said gasket in a single continuous surface.

17. A gasket comprising a body portion and independent binders therefor, said binders being located on opposite edges and sides of the said body portion, and covering only a portion of each side.

18. A gasket comprising a yielding body member, and a less yielding binder member contacting with a side and an edge of said body member, and presenting continuous surfaces of said body member and said binder member upon each side of said gasket.

In witness whereof I have hereunto set my hand this 26th day of April, 1907.

HARRY E. GREY.

Witnesses:
HARRY COBB KENNEDY,
ALEXANDER PARK.